March 1, 1966  L. E. GROSS  3,237,823
AUTOMOBILE LUGGAGE CARRIER
Filed Aug. 14, 1964
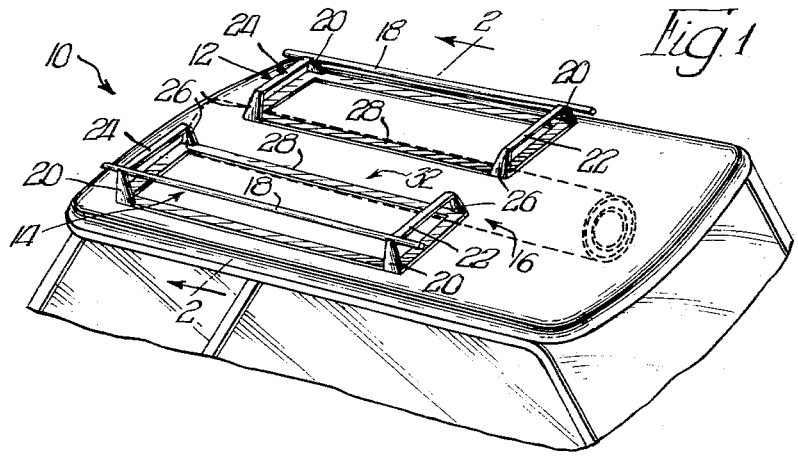
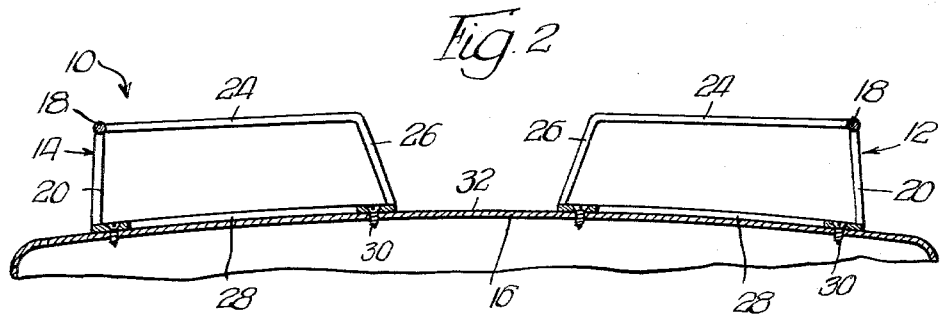
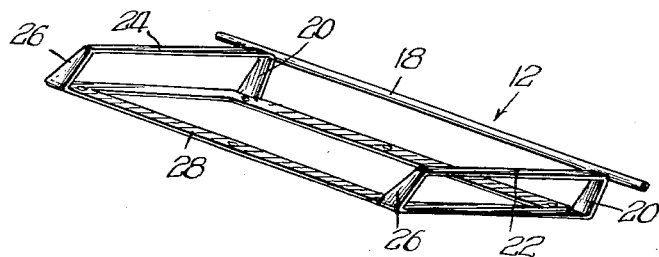
INVENTOR.
Louis E. Gross,
BY
Hume, Groen, Clement & Hume.
attys.

United States Patent Office 3,237,823
Patented Mar. 1, 1966

3,237,823
AUTOMOBILE LUGGAGE CARRIER
Louis E. Gross, Chicago, Ill., assignor to Unity Manufacturing Company, Chicago, Ill., a corporation of Illinois
Filed Aug. 14, 1964, Ser. No. 389,688
2 Claims. (Cl. 224—42.1)

The present invention relates to luggage carriers and more particularly to a novel automobile outside luggage carrier.

It is a general object of the present invention to provide an improved luggage carrier of the type attached to the horizontal surfaces of an automobile or station wagon.

It is an object of the invention to provide a novel luggage carrier adapted to mount upon any size of automobile.

It is another object of the present invention to provide an automobile luggage carrier having improved convenience of use and improved appearance.

It is a further object of the invention to provide an automobile luggage carrier having improved capabilities for handling elongate objects and reduced weight and wind resistance.

It is a more specific object of the present invention to provide an automobile luggage carrier which comprises at least two separate framework sections, separately attached to a roof area of an automobile in spaced apart relationship.

Further objects and advantages of the invention will be apparent from the following specification and drawings forming a part thereof, wherein:

FIGURE 1 is a perspective view of a luggage carrier in accordance with the present invention, showing an automobile roof upon which it is mounted;

FIGURE 2 is a cross-sectional view taken along the line 2—2 of FIGURE 1; and

FIGURE 3 is a perspective view of one of the framework members forming the luggage carrier of FIGURE 1.

Turning now to the drawings, FIGURES 1–3, there is shown therein an embodiment 10 of an automobile top luggage carrier according to the present invention. This luggage carrier 10 comprises basically two separate framework sections 12 and 14, each separately secured to an automobile roof 16. The two framework sections 12 and 14 are secured in parallel spaced positions with respect to each other on the roof 16, thereby providing an open area between the two sections. The two framework sections together with the roof form a complete luggage carrier of improved appearance for confining the cargo to be carried, providing adaptability to any size of automobile roof.

Referring in further detail to the components of each of the framework sections 12 and 14, the pair of framework sections are preferably identical or "mirror images" of each other, thus providing a pleasing symmetrical appearance and convenience in manufacturing. The word "complementary" as used herein to refer to this preferred similarity is intended to include opposing symmetrical, mirror image, or identical pair. Each framework section includes a side rail 18 extending the full length of the framework section. The side rail 18 is parallel to the longitudinal lines of the car roof near one edge of the roof and serves as one side rail for the luggage carrier 10. Each side rail 18 is preferably supported above the roof 16 at least at each end by vertical stanchions 20 which are permanently fastened to the automobile roof 16. The side rails 18 may be secured to the vertical stanchions 20 by welding, clamping, or other suitable means.

Each framework section 12 and 14 further includes a front end rail 22 and a rear end rail 24 which are in effect continuations of the side rails 18 but running perpendicular thereto. Like the side rail 18, the end rails 22 and 24 are preferably spaced above and substantially parallel to the surface of the automobile roof 16 and secured by the stanchions 20. The extremities of the end rails 22 and 24 opposite the connections to the vertical stanchions 20 (i.e., the extremities of these rails projecting into the central area of the automobile roof) are preferably supported by being fastened to vertical connecting members 26, which connect with the automobile roof 16. Thus connecting members 26 perform a function similar to the vertical stanchions 20. As shown here, the connecting members 26 may be formed simply by forming or bending the end portions of the end rails 22 and 24 in a downward direction. Preferably the connecting members 26 form an outwardly sloping angle with respect to the roof surface.

The manner of securing the framework sections 12 and 14 to the automobile roof 16 may be varied considerably, utilizing any of the various types of stanchions, bases, and fasteners. As shown here, rather than connecting the lower ends of the stanchions 20 and connecting members 26 directly to the roof 16, a mounting base is provided. The base 28 is adapted to lie in contact with the roof surface. All of the stanchions and connecting members of each framework section are preferably secured to this base by welding or the like. Then the base 28 is in turn permanently fastened to the roof 16 by a plurality of screws or fasteners 30, or other suitable means. An important aspect of the mounting of the framework sections 12 and 14 is that they are fastened to the roof 16 in a parallel spaced apart relationship, thus leaving a substantial space between the two framework sections in which there is no interconnection except an area 32 of the roof which mutually secures the two framework sections.

The material from which the luggage carrier is constructed is preferably of a durable and weather resistant finish having a pleasing appearance, such as chrome-plated metal, aluminum, etc. The various framework elements should of course have a sufficient diameter and strength to withstand any forces placed upon them by loads carried within the luggage carrier. Preferably, the entire framework sections are each one integral unit, formed by die casting or the like.

The employment of the luggage carrier 10 offers a number of operating advantages over conventional luggage racks. First, the luggage carrier of the invention incorporates a large percentage of the roof area as part of the carrier and provides a large capacity carrier without a correspondingly large framework. Utilization of the roof 16 in this manner is particularly advantageous in the case of modern station wagons which have a large flat roof area suitable for this purpose. The framework sections may be secured to opposing outer edges of any car roof, regardless of the roof size, and thereby employ the maximum possible roof width of any car. Further, the roof 16 of the automobile serves as the vertical load bearing surface for the entire luggage rack 10. Therefore the luggage rack is not required to support any of the vertical forces of the load and any structure which would otherwise be required to serve this purpose is eliminated.

Another advantage of the luggage carrier of the invention is that it provides support and retention for cargos within the luggage carrier on both sides and at both the front and rear of the luggage carrier. Front and rear end rails for a luggage rack are of particular importance, as they provide the retention of the cargo parallel to the direction of motion of the car. It is along this axis that the cargo is subject to the high accelerative and decelerative forces of the automobile, and thus the greatest need for positive retention of the cargo to prevent its loss or sliding. Prior luggage racks either have no front or no rear end supports, and thus are unsuitable in this respect, or employ continuous rails completely across the front and rear of the luggage carrier. A chief disadvantage of luggage racks having continuous front and rear rails is that this fixes the width of the luggage rack. Therefore these racks cannot be mounted on a car roof having a lesser width and cannot utilize the full width of a car roof having a greater width. Further, these prior luggage racks have a limit on the dimensions of objects which might be safely carried within the luggage rack. Objects longer than the distance between the front and rear end rails may only be carried by attempting to balance them on top of these end rails, which provided an insecure mounting without any side support, and imposed the full weight of the cargo as a vertical load upon the end rails, tending to break or bend them. Elimination of continuous end rails also provides an improved appearance and reduced weight and air resistance.

The luggage carrier of the invention provides the needed front and rear end rail support without employing continuous rails, and without imposing a limit on the length of objects to be carried. The present luggage carrier utilizes the maximum possible roof area, adapting to the width of the roof to which it is attached. Also it allows objects to be carried within the luggage rack, lying directly upon the roof of the car, which are longer than the luggage rack itself. As may be clearly seen from the drawings of the luggage carrier 10, a wide variety of elongate objects such as rugs, lumber, rolled tents, etc., may be carried on the roof area 32 provided between the two spaced framework sections 12 and 14 and extend beyond the end rails, both at the front and rear. Further, the connecting members 26 as well as the side rails 18 provide side or lateral support for the objects being carried in this roof area 32.

Objects which are smaller than the dimensions of the luggage carrier 10 are preferably carried completely within the framework members, within one of the framework sections 12 or 14, or within both framework sections, so that the object will be retained within both the side and the end rails. When an object is carried in this manner, it is confined at the sides and at both ends the same as by a luggage carrier having completely continuous front and end rails.

While the luggage carrier 10 has been described above as secured to an automobile roof top 16, it is to be appreciated that the invention is not limited thereto. In present or future automobile designs in which suitable and sufficiently large rear deck or front hood areas are provided luggage carriers of the invention may be mounted upon one or more of these areas in the same manner and with similar advantageous results. These rear deck and front hood areas are also "roof" areas, being portions of the generally planar and horizontal upper surfaces of the automobile. Thus, where the term "automobile roof" is employed herein it is to be considered as including or encompassing any one of the above areas or any future roof areas provided on automobiles or equivalent vehicles.

It is clear that there has been provided herein an automobile luggage rack of greater adaptability, capacity, and convenience, and more pleasing appearance. It is contemplated that further variations and modifications within the purview of those skilled in the art can be made herein, and it is intended to cover in the appended claims all such variations and modifications as fall within the true spirit and scope of the invention.

What is claimed is:
1. An automobile luggage carrier comprising:
   a substantially complementary pair of luggage carrier sections, each said section being adapted to separately mount to opposing sides of an automobile roof,
   each said section having a width less than one-half the width of an automobile roof so as to provide a substantial area of automobile roof between said pair of sections,
   each said section having an inner side, an outer side, a front end and a rear end,
   each said section having an automobile roof mounting means and a luggage retaining rail spaced above said mounting means, said retaining rail extending across only said outer side, said front end and said rear end,
   each said section having vertical support means upstanding from said mounting means at said inner side at said front and rear ends,
   said pair of sections, when spaced apart on an automobile roof, defining by said vertical support means a carrier between said pair of sections for objects more elongate than said pair of sections.

2. An automobile luggage carrier comprising:
   an automobile roof;
   a substantially complementary pair of luggage carrier sections, each said section being separately mounted to opposing sides of said automobile roof, said pair of sections being spaced apart on said automobile roof so as to provide a substantial area of said automobile roof between said pair of sections,
   each said section having an inner side, an outer side, a front end and a rear end,
   said pair of sections being mounted with said inner sides adjacent one another,
   each said section mounting a luggage retaining rail spaced above said automobile roof,
   said retaining rail extending across only said outer side, said front end and said rear end,
   each said section having vertical support means upstanding from said mounting means at said inner side at said front and rear ends,
   said pair of sections defining by said vertical support means a carrier between said pair of sections for objects more elongate than said pair of sections.

References Cited by the Examiner

UNITED STATES PATENTS

D. 182,705  5/1958  Binding.
3,120,914  2/1964  Smith.

HUGO O. SCHULZ, *Primary Examiner*.